Feb. 21, 1950  A. A. A. A. DE GRAMONT  2,497,981
MICROSCOPIC VERNIER READER
Filed May 20, 1946
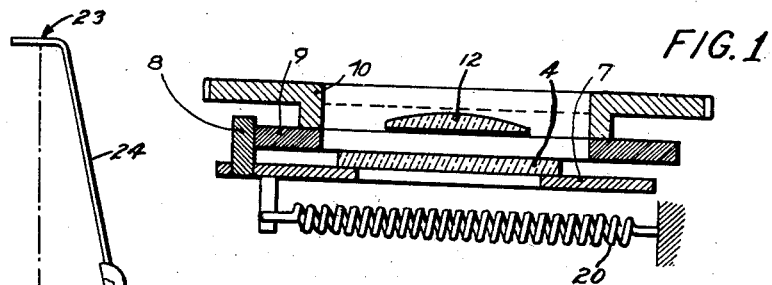
FIG. 1
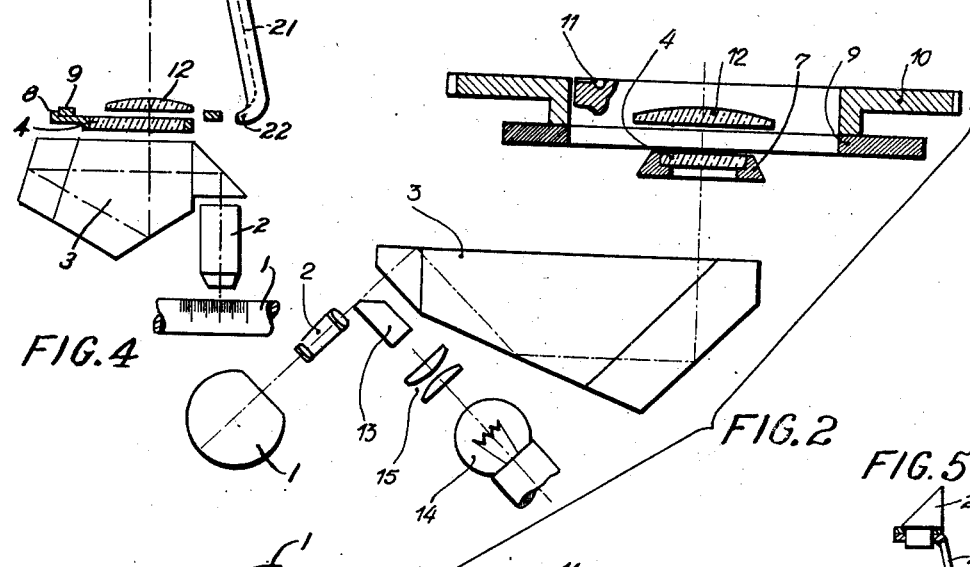
FIG. 4
FIG. 2
FIG. 5
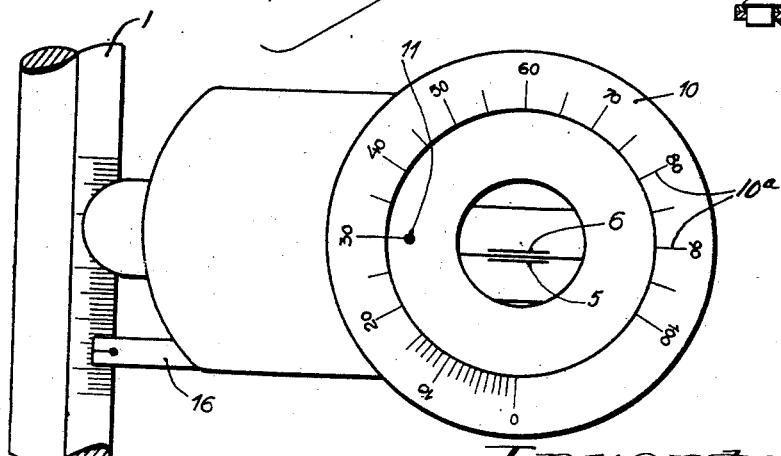
FIG. 3
Inventor
A. A. A. à De Gramont
By Glascock Downing Seibold
Attys.

Patented Feb. 21, 1950

2,497,981

UNITED STATES PATENT OFFICE 2,497,981

MICROSCOPIC VERNIER READER

Armand Antoine Auguste Agénor de Gramont, Levallois-Perret, France, assignor to Optique et Precision de Levallois, Levallois-Perret, France, a French company Application May 20, 1946, Serial No. 671,075
In France February 9, 1942

Section 1, Public Law 690, August 8, 1946
Patent expires February 9, 1962

4 Claims. (Cl. 88—1)

1

The object of my invention is the provision of a simple and conveniently operable instrument that affords great accuracy in determining the setting of a measuring scale.

The following description and the attached drawing show as examples two ways of carrying out my invention:

Fig. 1 is a diagrammatic front elevational cross-section of the device.

Fig. 2 is a diagrammatic sectional side view of the device.

Fig. 3 is a diagrammatic plan illustrating what the reader of the instrument actually sees when it is at work.

Fig. 4 is a diagrammatic section in elevation of an arrangement including a sighting ring.

Fig. 5 is a partial view showing the application of a prism to the sighting ring as used in Fig. 4.

The first form of execution, given as an example and illustrated in Figs. 1, 2, and 3 is as follows:

A real enlarged view of the divisions of scale I, movable in relation to the observer, is projected by an objective 2, through a rectifying prism 3, on the engraved face of a glass 4 that has two lines 5 and 6 parallel to the image of the lines of the divisions of scale I. This glass is set in a slide-block 7 that moves at right angles to the engraved lines 5 and 6. It is drawn by a spring 20, a finger 8 bearing against a rotatable spiral-shaped cam 9.

A milled engraved rim 10 is fixed rigidly to the cam 9, and it is provided with graduations 10a. When the rim is rotated its angular displacement is determined by the position of the graduation 10a with relation to a pointer 11 and thus the position of the glass 4 may be accurately determined. The engraved surface of this glass is finely ground and through a collecting lens 12 it is easy to see simultaneously the engraved marks 5 and 6 as well as the image of the divisions of scale I projected on the ground glass. Virtual images of these different marks or scales appear at a normal distance of sight for the eye when it is above the optical image, while the reading with the naked eye of the graduated rim 10 and of the pointer 11 can be done at the same time.

An illuminating prism 13, covering part of the objective 2, affords, through any known optical device, a powerful lighting of the scale I through a primary light 14 and a condenser 15. A pointer 16 that changes position relatively to scale I can be used to read on the scale the integral numbers.

The arrangement, illustrated diagrammatically

2 in Fig. 4, varies from the above described device by the fact that the image of the scale I presented by the objective 2 is projected again, through the agency of a compound prism 3, in the plane of the glass 4, but in this case, the glass is not ground and so it is the aerial image (that is, an image not projected on a screen) that is seen through the collecting lens 12; the observer's eye is at the sighting circle 23 that is carried, for instance, by an extension 24 of a cover 21 that is pivoted at 22, and this cover can be lowered so as to serve as a guard, when the instrument is not being used, for the collecting-lens 12 and the scale that surrounds it. The sighting ring 23 can be furnished with a roof-shaped prism 26 (Fig. 5) that can rotate about the optical axis and thus allow the observer to take readings in a direction differing with that of the optical axis.

In the two forms of the device, as pointed out and in all those connected with the invention, the modus operandi is as follows:

When making a reading, the observer sees in the optical range, on the one hand the lines 5 and 6 of the mark and on the other hand the highly magnified projection of the divisions of the scale I. The milled and graduated rim 10 is turned to adjust the lines 5 and 6 so that they enclose exactly the projection of a line of the scale I illustrated in Fig. 3.

The reading 10a opposite the pointer 11 gives the figure corresponding to the turning of the rim 10. If the travel of the cam corresponds to $n$ divisions, for the transit of the interval between the marks from one division to another of the scale, the number read will tell directly the number $1/n$ of a division to add to the integral number of divisions read directly on the scale opposite the pointer 16.

What I claim is:

1. An optical graduation reader for viewing a relatively fixed scale, said reader comprising a unit adapted to move along the scale and including a microscopic reader forming an image of the fixed scale, a composite prism arranged to reflect the scale image, an annular member rotatable on the unit and having a circular series of graduations thereon disposed concentrically with respect to the optical axis of the rays reflected by said prism and forming the scale image, a cam operated by the annular member, index mark means disposed in the field of view and operatively connected with the cam so as to be displaceable with relation to the reflected scale image and moved proportionately to the degree of rotation of the cam, and a fixed index mark carried by the unit and co-acting with the graduations for indicating the extent of angular movement of the annular member required to bring the displaceable index mark means into substantial coincidence with the reflected scale image.

2. An optical graduation reader for viewing a relatively fixed scale, said reader comprising a unit adapted to move along the scale and including a microscopic reader forming an image of the fixed scale, a composite prism arranged to reflect the scale image, a ground glass disposed to receive said image, an annular member rotatable on the unit and having a circular series of graduations thereon disposed concentrically with respect to the optical axis of the rays reflected by said prism and forming the scale image on said ground glass, a cam operated by the annular member, said ground glass being operatively connected with the cam so as to be displaceable in a direction perpendicularly to the axis of the scale image and moved proportionately to the degree of rotation of the cam, two index marks in the field of view, carried by and displaceable with said ground glass, and a fixed index mark carried by the unit and co-acting with the graduations for indicating the extent of angular movement of the annular member required to bring the two displaceable index marks in position on opposite sides of the scale image.

3. An optical graduation reader for viewing a relatively fixed scale, said reader comprising a unit adapted to move along the scale and including a microscopic reader forming an image of the fixed scale, a composite prism arranged to reflect the scale image, an annular member rotatable on the unit and having a circular series of graduations thereon disposed concentrically with respect to the optical axis of the rays reflected by said prism and forming the scale image, a cam operated by the annular member, a glass operatively connected with the cam so as to be displaceable in a direction perpendicularly to the axis of the scale image and moved proportionately to the degree of rotation of the cam, two index marks in the field of view, carried by and displaceable with said glass, a fixed index mark carried by the unit and co-acting with the graduations for indicating the extent of angular movement of the annular member required to bring the two displaceable index marks in position on opposite sides of the scale image, a collecting lens for viewing the scale image reflected by said prism, a pivoted cover movable to a position to protect the collecting lens and annular member, and an arm carried by said cover having a sight opening therein movable into a position coinciding with the axis of the reflected scale image.

4. An optical graduation reader as claimed in claim 3 provided with a reflecting prism rotatable in said sight opening and movable into various positions for further reflecting the reflected scale image.

ARMAND ANTOINE AUGUSTE
AGÉNOR DE GRAMONT.

REFERENCES CITED

The following references are of record in the file of this patent:

UNITED STATES PATENTS

| Number | Name | Date |
| --- | --- | --- |
| 759,233 | Bond | May 10, 1904 |
| 1,494,565 | Abraham | May 20, 1924 |
| 1,566,278 | Kellner | Dec. 22, 1925 |
| 1,761,260 | Gallasch | June 3, 1930 |
| 2,363,700 | Soetbeer | Nov. 28, 1944 |